J. A. STEPHENS.
COVER FOR SHIPPING AND STORING VESSELS.
APPLICATION FILED DEC. 23, 1911.
1,147,657.
Patented July 20, 1915.
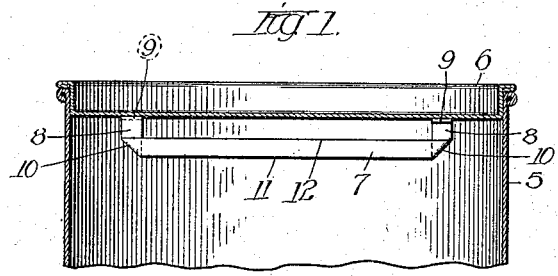
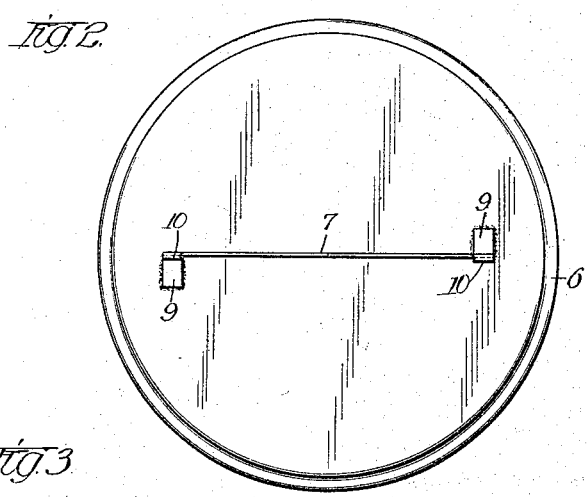
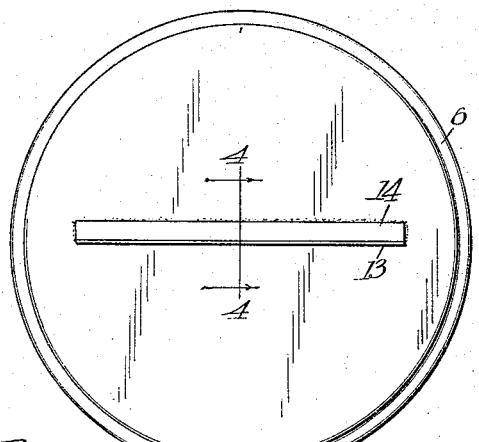
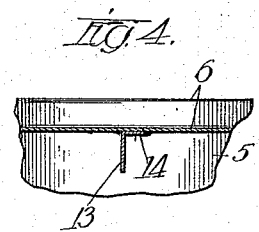

UNITED STATES PATENT OFFICE.

JOHN A. STEPHENS, OF CHICAGO, ILLINOIS.

COVER FOR SHIPPING AND STORING VESSELS.

1,147,657.           Specification of Letters Patent.     Patented July 20, 1915.

Application filed December 23, 1911. Serial No. 667,541.

*To all whom it may concern:*

Be it known that I, JOHN A. STEPHENS, a citizen of the United States, and a resident of Chicago, in the county of Cook and State of Illinois, have invented certain new and useful Improvements in Covers for Shipping and Storing Vessels, of which the following is a full, clear, and exact specification.

This invention relates to improvements in covers for shipping and storing vessels in which heretofore a cover either of metal, wood or glass is removable for access to the contents and replaced for resealing the vessel, and particularly to covers for vessels the contents of which are plastic or semi-plastic.

Heretofore after removing the cover from shipping and storing vessels containing plastic or semi-plastic material, it has been the common practice to scrape upon the edge of the vessel the instrument of removal as for example the spatula, knife, paddle or spoon, to remove the material adhering thereto and then replace the cover. This means of cleansing, however, is objectionable for the reason that enough of the material so removed remains upon the edge of the vessel and between the vessel and the cover, that for example with ointments, lard, butter, etc., they become rancid and a collector of dust and other foreign substances, falling into the receptacle and mixing with the contents on again removing the cover therefrom, and especially when the spatula, knife, etc., is subsequently cleansed on wiping it across the edge of the vessel.

The object of my invention is to dispense with any necessity for cleansing the knife on the edge of the receptacle by providing the cover with a scraper on its under surface, which, when the cover is in its operative position, is suspended directly above the contents of the vessel and away from its edge and sides whereby a spatula, knife, etc., may be cleansed of the material adhering thereto in the absence of any possibility of the knife or such material coming in contact with the edge of the vessel, and whereby any material falling from the knife or the surface against which it is scraped will drop back into the receptacle free and clear of its edge and sides, and especially the former.

A further object of my invention is to provide a cover with a spatula or knife cleansing device of substantially less length than the inner diameter of the cover so that material falling therefrom will directly contact with the contents of the vessel and so constructed as to be cheaply secured to the cover and form a permanent part thereof.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claim.

In said drawing: Figure 1 illustrates a detail vertical section of a shipping and storing vessel provided with a cover in which my invention finds embodiment. Fig. 2 illustrates a plan view of the under surface of the cover showing the position of the scraper of my invention relative thereto. Fig. 3 is a plan view of the underside of a cover showing a modified form of my invention, and: Fig. 4 is a detail transverse section thereof and of a vessel receiving the cover.

Similar characters of reference indicate the same parts in the several figures of the drawing.

5 indicates a shipping and storing vessel which may be of any usual material and form, although shown in the drawing of sheet metal and circular in cross section, and in which may be fitted a cover 6 for excluding foreign substances and preferably sealing the vessel substantially air tight although shown in the drawing as consisting of a telescoping sheet metal cover provided with the usual flange seated upon the edge or rim of the vessel. To the underside of the cover 6 is a blade 7 secured to the cover at its opposite ends by legs 8—8 provided with feet 9 directly fastened to the cover at a point removed from the periphery thereof. The blade 7 is preferably formed from quite a narrow strip of sheet metal with the legs bent therefrom by bending the strip upon itself as indicated at 10—10 with the feet bent from the ends of the legs by a right angular bend therein as indicated in Figs. 1 and 2, and secured in operative position with solder when the can is of metal, and when of wood by screws or nails driven through the feet into the cover.

The construction above described and as illustrated in Figs. 1 and 2 serves to project the knife blade body away from the cover and thereby furnish both a lower scraping edge 11 and an upper scraping edge 12 for a spatula, knife, etc., as may be drawn across the same and at the same time preventing when desired the material scraped from the spatula, knife, etc., from coming in contact with and adhering to the under surface of the cover and promoting the detachment of the removed material from the scraper when the cover is replaced in its operative position upon the vessel.

My invention also finds embodiment as shown in Figs. 3 and 4 wherein there is secured at the underside of the cover a blade 13 bent from a strip of metal in which there is bent at right angles forming a flange 14 extending wholly or may be partly the length of the blade and serving as a means for securing the blade to and suspending from the underside of the cover either by soldering, riveting or nailing the flange 14 thereto.

In this connection it should be observed that my invention is not limited to the form of construction of the scraping blade secured to the under surface of the cover for a shipping or storing vessel of any kind, nor to restricting its length to less than that of the greatest inner diameter face of the cover, so long as such blade may be successively used for removing plastic and semi-plastic materials adhering to the removing instrument from the contents of the vessel, and with ordinary care prevent any portion of the material scraped from the knife from contacting with the edge or flange of the cover, and the edge of the vessel, where it will be exposed to contact with the air or to foreign substances.

It may also be observed that my invention provides for removing from the extracting implement and returning to the vessel, material without outwardly smearing either the vessel or the cover, and thereby preserving the original sightliness of the vessel or container, and without liability to soil its handlers as heretofore.

Having described my invention, what I claim and desire to secure by Letters Patent is:

A cover for shipping and storing vessels provided on its underside with a straight edge scraping blade secured by legs bent therefrom and bodily suspending the blade away from the cover, substantially as described.

In witness whereof, I have hereunto set my hand and affixed my seal, this 19th day of December, A. D. 1911.

JOHN A. STEPHENS. [L. S.]

Witnesses:
   JNO. G. ELLIOTT,
   MILDRED ELSNER.

Copies of this patent may be obtained for five cents each, by addressing the "Commissioner of Patents, Washington, D. C."